US007349793B2

(12) United States Patent
Takayanagi

(10) Patent No.: US 7,349,793 B2

(45) Date of Patent: Mar. 25, 2008

(54) CONTROL APPARATUS FOR VEHICLE AND METHOD OF SWITCHING MODE OF CONTROL UNIT OF CONTROL APPARATUS

(75) Inventor: Keiichi Takayanagi, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/453,976

(22) Filed: Jun. 16, 2006

(65) Prior Publication Data

US 2006/0287804 A1 Dec. 21, 2006

(30) Foreign Application Priority Data

Jun. 16, 2005 (JP) ............................ 2005-176405
Jun. 16, 2005 (JP) ............................ 2005-176406

(51) Int. Cl.
*G06F 19/00* (2006.01)
*F02M 17/30* (2006.01)

(52) U.S. Cl. .................................. 701/112; 123/198 D

(58) Field of Classification Search ................ 701/101, 701/102, 112, 113, 114; 123/179.1, 198 D; 73/118.1; 251/129.15
See application file for complete search history.

(56) References Cited

U.S. PATENT DOCUMENTS 3,610,611 A * 10/1971 Elliott et al. ............. 267/64.18
4,775,939 A * 10/1988 Nakashima et al. .......... 701/49
5,761,627 A * 6/1998 Seidel et al. .................. 701/41
6,363,919 B1 * 4/2002 Isobe et al. ................. 123/520
6,687,581 B2 * 2/2004 Deguchi et al. .............. 701/22
6,879,895 B2 * 4/2005 Capps et al. .................. 701/36
6,882,913 B2 * 4/2005 Bullister et al. .............. 701/41
7,082,359 B2 * 7/2006 Breed .......................... 701/36

FOREIGN PATENT DOCUMENTS

JP 11-263179 9/1999

* cited by examiner

*Primary Examiner*—Willis R. Wolfe, Jr.
*Assistant Examiner*—Johnny H. Hoang
(74) *Attorney, Agent, or Firm*—Foley & Lardner LLP

(57) ABSTRACT

In an engine of a vehicle provided with a normally-closed solenoid valve in a fresh air induction port of a canister, in the case where a refueling cap is open when the engine is stopped, a control module operates in a usual-power consumption mode, and forces closing of the solenoid valve. In the case where the refueling cap is closed, the control mode shifts to a low-power consumption mode, and maintains the solenoid valve in the closed condition.

12 Claims, 6 Drawing Sheets

CONTROL APPARATUS FOR VEHICLE AND METHOD OF SWITCHING MODE OF CONTROL UNIT OF CONTROL APPARATUS

BACKGROUND OF THE INVENTION

1. Field of the Invention

The present invention relates to a technique for reducing the power consumption of a control apparatus for a vehicle that outputs drive signals to an electric component installed in the vehicle.

2. Description of the Related Art

Japanese Unexamined Patent Publication No. 11-263179 discloses a vehicle control apparatus that is configured to be switched to a power saving mode in either a state where an ignition switch is off or a state where the vehicle is stopped, and is configured to return to a normal mode in a state where the ignition switch is on or the brake is operated.

The above-described conventional vehicle control apparatus is, however, switched to the power saving mode in a state where the vehicle is stopped and therefore, various kinds of electric components installed in the vehicle cannot be controlled anymore.

For example, in a case where a normally-closed type solenoid valve is provided in a fresh air induction port of a canister that collects fuel vapour generated in a fuel tank, it is necessary to open the solenoid valve upon refuelling, in order to allow the fuel tank to be opened toward the atmosphere via the canister.

However, if the control apparatus is in power saving mode, a supply of current cannot be sufficient for activating the solenoid valve. Therefore, it is necessary to hold the control apparatus in normal mode in order to enable refueling.

However, if the control apparatus is operated in normal mode while the engine is stopped, the power consumption of the control apparatus increases, and hence there is a problem such that the battery will be depleted.

SUMMARY OF THE INVENTION

In view of the above-mentioned problem encountered by the conventional art of technology, an object of the present invention is to provide a novel technology for reducing the power consumption of a control apparatus for a vehicle during stopping of the vehicle engine, while still enabling necessary controlling operation.

Another object of the present invention is to provide a control apparatus for a vehicle, which is able to operate based on the above-mentioned novel technology.

A further object of the present invention is to provide a method of switching a mode of a control unit controlling an output of a drive signal to an electric component installed in a vehicle.

In order to achieve the above objects, the present invention basically adopts such a configuration that determination is executed as to whether or not conditions require the output of a drive signal to an electric component, and switching to either one of two operation modes, i.e., a low-power consumption mode that cannot output the drive signal, and a usual-power consumption mode that can output the drive signal.

The other objects, features and advantages of this invention will become apparent from the following description with reference to the accompanying drawings.

DESCRIPTION OF PREFERRED EMBODIMENTS

Figure 1:
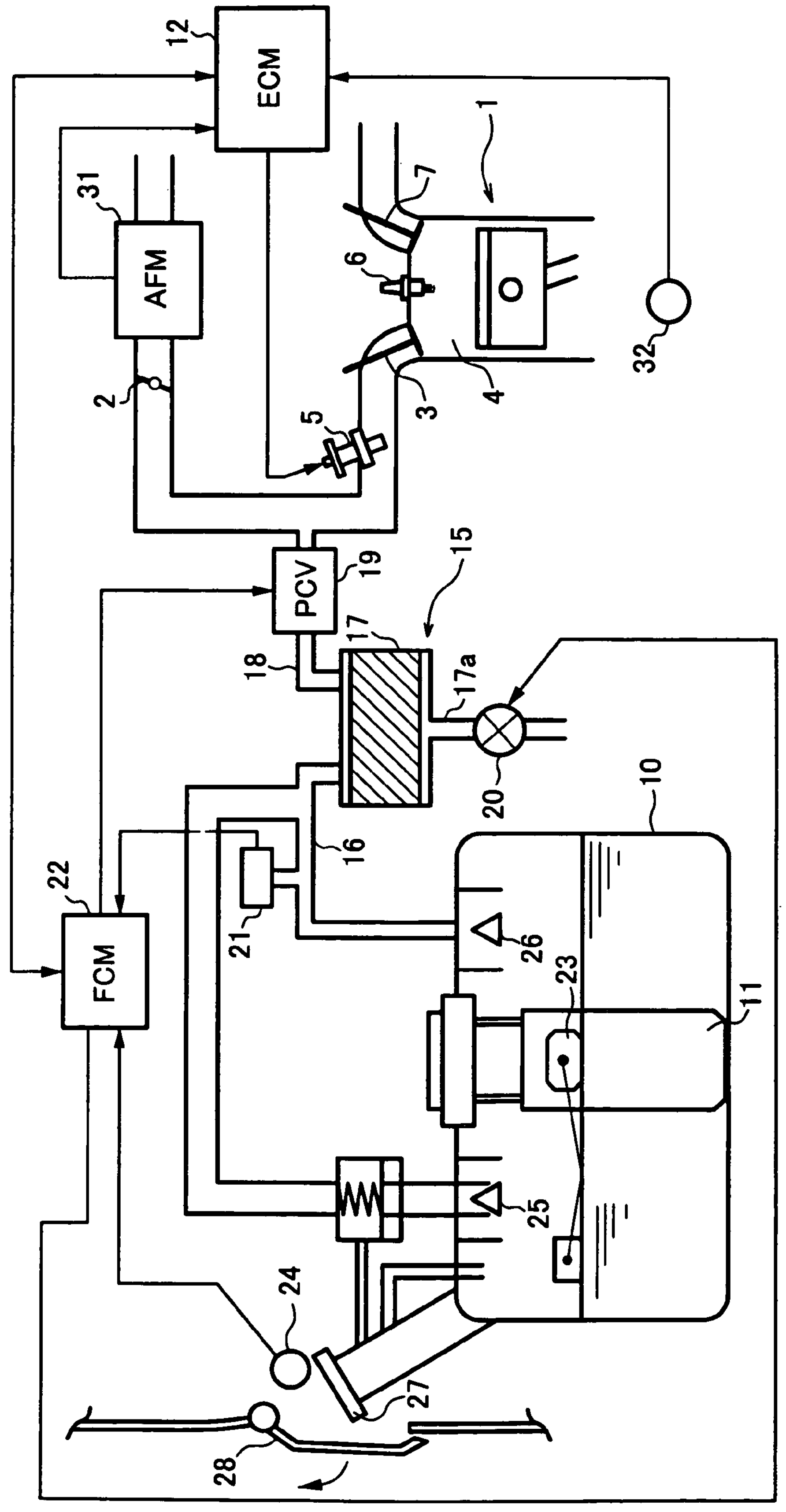
FIG. 1 is a system diagram of an engine of the embodiments of the present invention.

FIG. 1 shows a vehicle engine according to the respective preferred embodiments of the present invention.

Engine 1 is a gasoline internal combustion engine.

Air is introduced by suction into combustion chamber 4 of engine 1 via throttle valve 2 and inlet valves 3. Furthermore, fuel is injected into the inlet ports of engine 1 by fuel injection valves 5.

The fuel in combustion chamber 4 is ignited and combusted by spark ignition by spark plugs 6. The exhaust gas is exhausted from combustion chamber 4 via exhaust valves 7.

Fuel pump 11 is installed in fuel tank 10.

Gasoline is supplied to fuel injection valves 5 by fuel pump 11.

Fuel injection valves 5 and spark plugs 6 are controlled by engine control module 12.

Engine control module (i.e., control unit for a vehicle engine) 12 includes a microcomputer.

Engine control module 12 has inputs for receiving detection signals from a variety of sensors, and controls the amount of fuel injection that is injected by fuel injection valves 5, and also the spark timing of spark plugs 6, through calculation processing, which is executed based on the above-mentioned detection signals.

Air flow meter 31, which detects the amount of intake air of engine 1 on the upstream side of throttle valve 2, and crank angle sensor 32, which detects the angle of rotation of the crank shaft, are provided as the above-mentioned variety of sensors.

Furthermore, fuel vapor handling system 15 is provided in engine 1.

Fuel vapor generated in fuel tank 10 is adsorbed in an adsorbent in canister 17 via fuel vapor induction path 16.

Then, when the inlet negative pressure of engine 1 acts upon canister 17 via purge path 18, fuel vapor adsorbed in canister 17 is desorbed by fresh air inducted from fresh air induction port 17*a*.

Fuel vapor desorbed from canister 17 is supplied to an inlet passage on the downstream side of throttle valve 2 of engine 1 via purge path 18.

Purge control valve 19, which is a normally-closed type solenoid valve, is provided in purge path 18. The purge flow is controlled by the opening of purge control valve 19.

Furthermore, air cut valve 20, which is a normally-closed type solenoid valve, is provided in fresh air induction port 17*a*.

Here, the normally-closed type solenoid valve is a solenoid valve that maintains a closed state when no current is supplied, and opens when current is supplied.

In the case where fuel vapor is desorbed from canister 17, air cut valve 20 is controlled to be opened, and the opening of purge control valve 19 is adjusted.

Purge control valve 19 and air cut valve 20 use normally-closed type solenoid valves as described previously in order to prevent the fuel vapor from flowing when the engine stops.

Moreover, in a state in which purge control valve 19 and air cut valve 20 are closed, a diagnostic area including fuel tank 10, fuel vapor induction path 16, canister 17, and purge path 18 upstream of purge control valve 19, is closed.

Pressure sensor 21, which detects the pressure of the diagnostic area, is provided.

Here, from a detection result of pressure sensor 21 in a state in which the diagnostic area is closed, it is diagnosed whether there is a leakage hole or not in the diagnostic area.

Fuel pump 11, purge control valve 19, and air cut valve 20, are controlled by fuel supply control module 22.

Fuel supply control module 22 includes a microcomputer such that it can communicate with engine control module 12.

Fuel supply control module 22 inputs a detection signal from pressure sensor 21, and also inputs a detection signal from fuel level gauge 23, and a signal from switch 24 which detects an open state of cap 27 of a filler hole.

The arrangement may be such that switch 24 detects an open state of fuel filler lid 28.

Then, fuel supply control module 22 receives a purge request signal from engine control module 12, and controls purge control valve 19 and air cut valve 20.

Furthermore, fuel supply control module 22 diagnoses whether there is leakage using the detection result of pressure sensor 21, and transmits the result of the leakage diagnosis and information of the residual fuel quantity to engine control module 12.

Here, fuel tank 10 is provided with mechanical valve 25 for releasing the pressure when the pressure in fuel tank 10 becomes abnormally high, and mechanical valve 26 which closes when the fuel tank is full to prevent the liquid fuel from flowing into canister 17 side.

Incidentally, when refueling fuel tank 10, if air cut valve 20 is closed, the pressure in fuel tank 10 increases as it is refueled, and hence refueling cannot be performed continuously.

Therefore, it is necessary for fuel supply control module 22 to also operate while engine 1 is stopped, and to perform opening control of air cut valve 20 when refueling is requested.

In order to perform the above-described refueling control, battery power is supplied to fuel supply control module 22 without going via the ignition switch.

Figure 2:
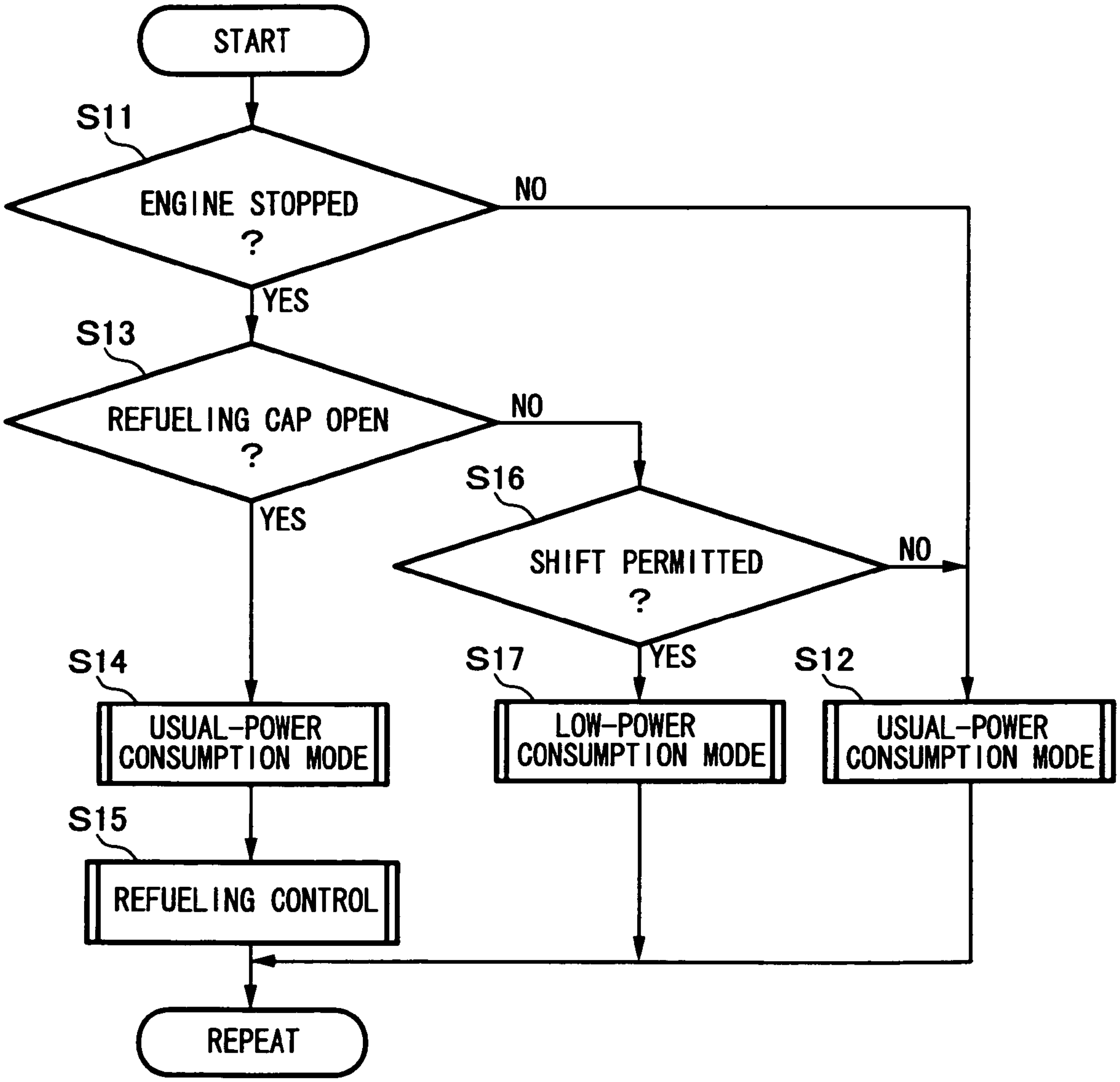
FIG. 2 is a flow chart showing a first embodiment of refueling control according to the present invention.

The flow chart of FIG. 2 shows a first embodiment of refueling control by fuel supply control module 22.

In step S11, it is determined whether or not engine 1 is stopped.

A state in which the engine is stopped is determined from an engine rotation signal transmitted from engine control module 12, and an on-off signal from the ignition switch.

In the case where engine 1 is not stopped, it is necessary to control fuel pump 11 and the like and thus, control proceeds to step S12 where an operation is set to usual-power consumption mode.

Here, usual-power consumption mode is a mode wherein power consumption is higher than a low-power consumption mode to be described later, and that can perform the reading of external signals and drive control of fuel pump 11, and furthermore a range of control functions such as opening control of purge control valve 19 and air cut valve 20, normally.

In contrast to this, a low-power consumption mode to be described later is a mode wherein power consumption is less than the usual-power consumption mode, and in which opening control of purge control valve 19 and air cut valve 20 are disabled.

In the low-power consumption mode, for example by decreasing the clock frequency of a CPU, and operating only those parts that perform reading of signals and communication, the power consumption of a microcomputer is decreased.

When it is determined in step S11 that engine 1 is stopped, control proceeds to step S13, and it is determined by the signal from switch 24 whether refueling cap 27 of fuel tank 10 is open or not.

In the case where refueling cap 27 is open, control proceeds to step S14, and usual-power consumption mode is set.

Next, control proceeds to step S15, and in order to enable refueling, a drive signal is output to air cut valve 20 to set air cut valve 20 to an open state. That is, when refueling cap 27 is open, air cut valve 20 is maintained in an open state.

In the case where refueling cap 27 is open, a drive signal is output to air cut valve 20 in order to enable refueling, and fuel tank 10 is open to the atmosphere via canister 17.

On the other hand, in the case where refueling cap 27 is not open, control proceeds to step S16.

In step S16, it is determined whether permission conditions for transfer to low-power consumption mode are satisfied or not.

Here, a situation such as where no control is performed other than opening control of air cut valve 20 for refueling, and the ignition switch is off, is determined as the transfer permission conditions.

Then, in the case where the transfer permission conditions are satisfied, control proceeds to step S17, and shifts to low-power consumption mode.

Accordingly, when the engine is stopped, low-power consumption mode is active except when refueling.

In the low-power consumption mode, opening control of air cut valve 20 is disabled, and refueling cannot be performed normally. However, the power consumption of fuel supply control module 22 decreases, so that the battery consumption can be suppressed.

However, also during low-power consumption mode, a routine as shown in the flow chart of FIG. 2 is executed repeatedly, and when refueling cap 27 is opened during low-power consumption mode, control returns to usual-power consumption mode, performs opening control of air cut valve 20, and shifts to a refueling enabled state.

That is, when the engine is stopped, fuel supply control module 22 is maintained in a state in which power is supplied all of the time. However, it is held in low-power consumption mode, and returns to usual-power consumption mode only when refueling.

Here control operations using manual operations such as the operation of opening refueling cap 27 as a trigger do not generally require high responsiveness.

Therefore, even if a required control operation is performed after a shift from low-power consumption mode to usual-power consumption mode, control is performed with necessary and sufficient responsiveness, and there is no control delay that disturbs the refueling operation.

Figure 3:
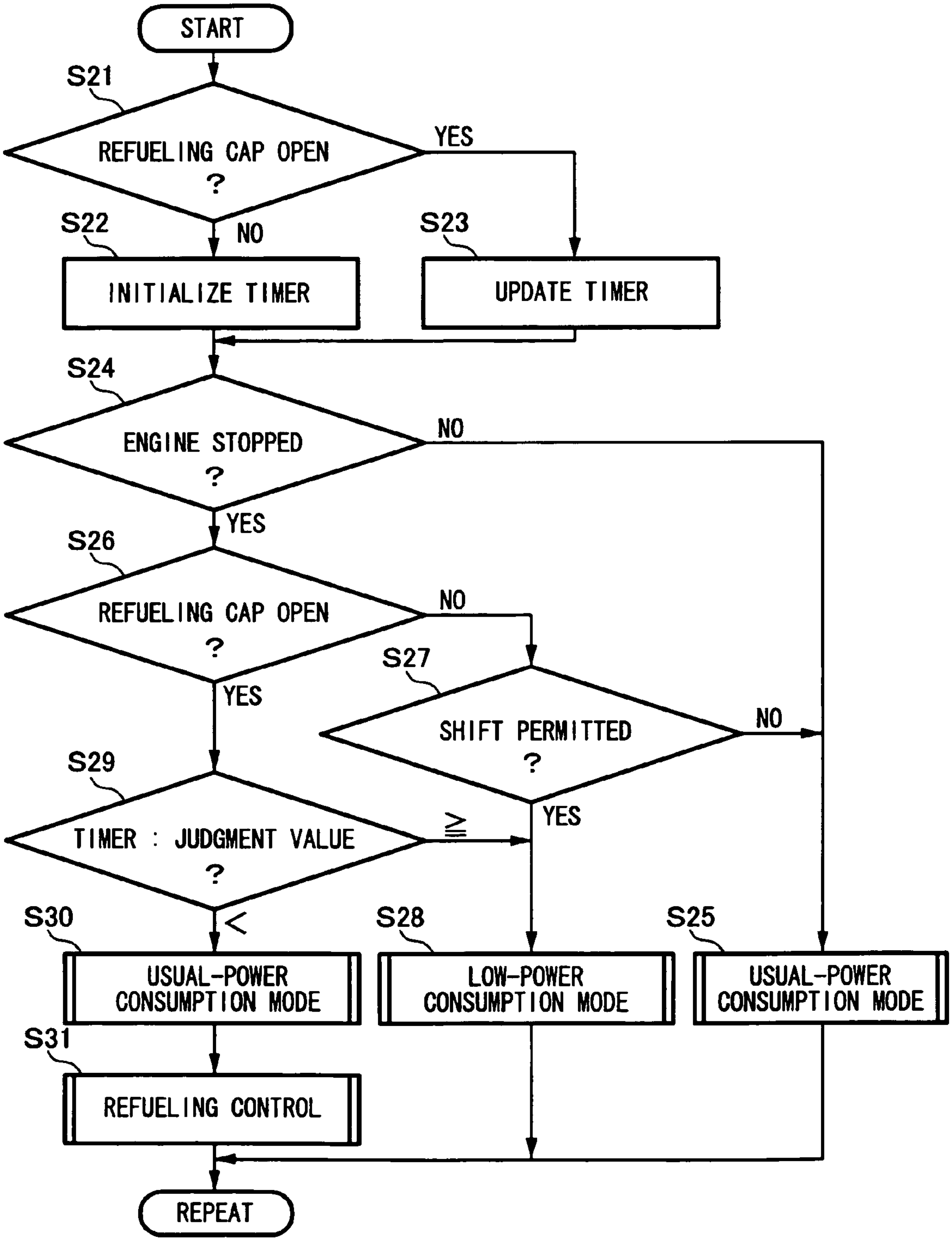
FIG. 3 is a flow chart showing a second embodiment of refueling control according to the present invention.

The flow chart of FIG. 3 shows a second embodiment of the refueling control.

In the second embodiment, a process is added to the first embodiment in which a case is assumed where refueling cap 27 is left in an open state.

In step S21, it is determined whether refueling cap 27 is open or not, by the signal from switch 24.

Then in the case where refueling cap 27 is closed, control proceeds to step S22, and the value of a timer for measuring the duration of the refueling state is initialized.

On the other hand, in the case where refueling cap 27 is open, control proceeds to step S23, and the value of the timer is updated.

In step S24, it is determined whether engine 1 is stopped or not, and if engine 1 is operating, control proceeds to step S25, and usual-power consumption mode is set.

On the other hand, when engine 1 is stopped, control proceeds to step S26, and it is determined whether refueling cap 27 is open or not.

In the case where refueling cap 27 is closed, it is determined whether the transfer permission conditions are satisfied or not in step S27, similarly to step S16.

If the transfer permission conditions are satisfied, control proceeds to step S28, and shifts to low-power consumption mode.

Furthermore, in the case where it is determined that refueling cap 27 is open in step S26, in step S29 it is determined whether or not the time measured by the timer is greater than or equal to a judgment value.

The judgment value is set as a time that will not be exceeded in a normal refueling operation, based on the maximum time predicted to be necessary for a normal refueling operation.

Accordingly, in the case where it is determined that the time measured by the timer exceeds the judgment value, it means that refueling cap 27 has been open for an abnormally long time.

On the other hand, even if refueling cap 27 is open for refueling, if a time that exceeds the judgment value has passed, it can be assumed that refueling has already been completed. Hence it is not necessary to maintain the refueling enabled state after exceeding the judgment value.

Therefore, in step S29, if it is determined that the time measured by the timer is greater than or equal to the judgment value, control proceeds to step S28, and shifts to low-power consumption mode.

In this manner, even if closing refueling cap 27 is forgotten, operating in usual-power consumption mode unnecessarily is avoided. Thus it is possible to economize on the power consumption of fuel supply control module 22 while engine 1 is stopped.

When the time measured by the timer is greater than or equal to the judgment value, it is possible to warn the driver of the vehicle that refueling cap 27 is open.

Moreover, in step S29, in the case where it is determined that the time measured by the timer is less than the judgment value, it is determined to be in a normal refueling request state.

Therefore, control proceeds to step S30, and returns to usual-power consumption mode. In the next step S31, a drive signal is output to air cut valve 20 in order to enable refueling.

Figure 4:
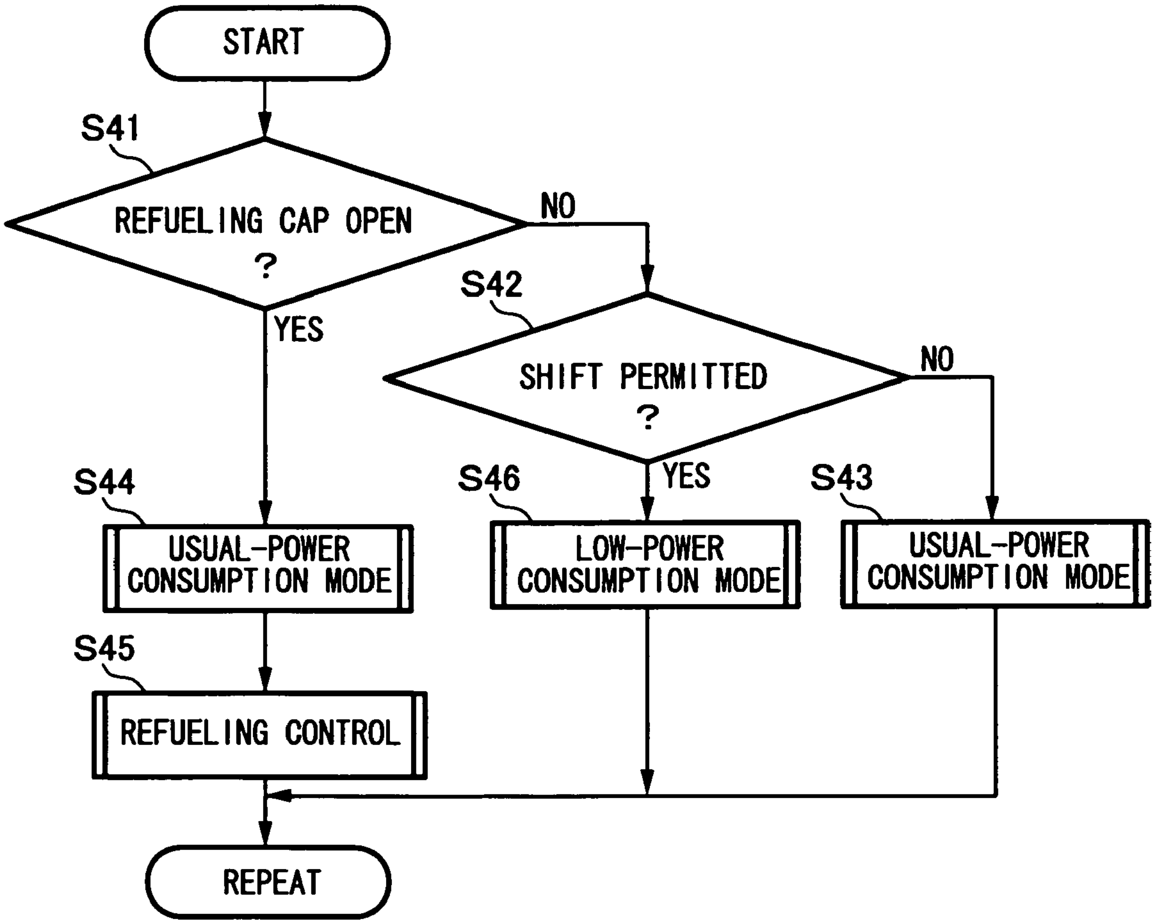
FIG. 4 is a flow chart showing a third embodiment of refueling control according to the present invention.

The flow chart of FIG. 4 shows a third embodiment of the refueling control.

In the third embodiment, the determination in step S1, of whether the engine is stopped or not, is omitted compared with the first embodiment shown in the flow chart of FIG. 2. The steps of step S41 to step S46 perform the same processes as step S12 to step S17 of the flow chart of FIG. 2.

The third embodiment is used in the case where fuel supply control module 22 does not control fuel pump 11, but controls the opening of air cut valve 20 for leakage diagnosis and refueling.

In step S41, it is determined whether refueling cap 27 is open or not.

If refueling cap 27 is open, control proceeds to step S44, shifts to usual-power consumption mode, and in the next step S45, a drive signal is output to air cut valve 20, to enter a refueling enabled state.

On the other hand, if refueling cap 27 is closed, control proceeds to step S42, and similarly to step S16, it is determined whether the permission conditions for transfer to low-power consumption mode are satisfied or not.

If the transfer permission conditions are satisfied, control proceeds to step S46, and shifts to low-power consumption mode. If the transfer permission conditions are not satisfied, control proceeds to step S43, and usual-power consumption mode is set.

In this case, if leakage diagnosis and refueling are to be performed while the engine is stopped, fuel supply control module 22 enters low-power consumption mode while the engine is operating.

Figure 5:
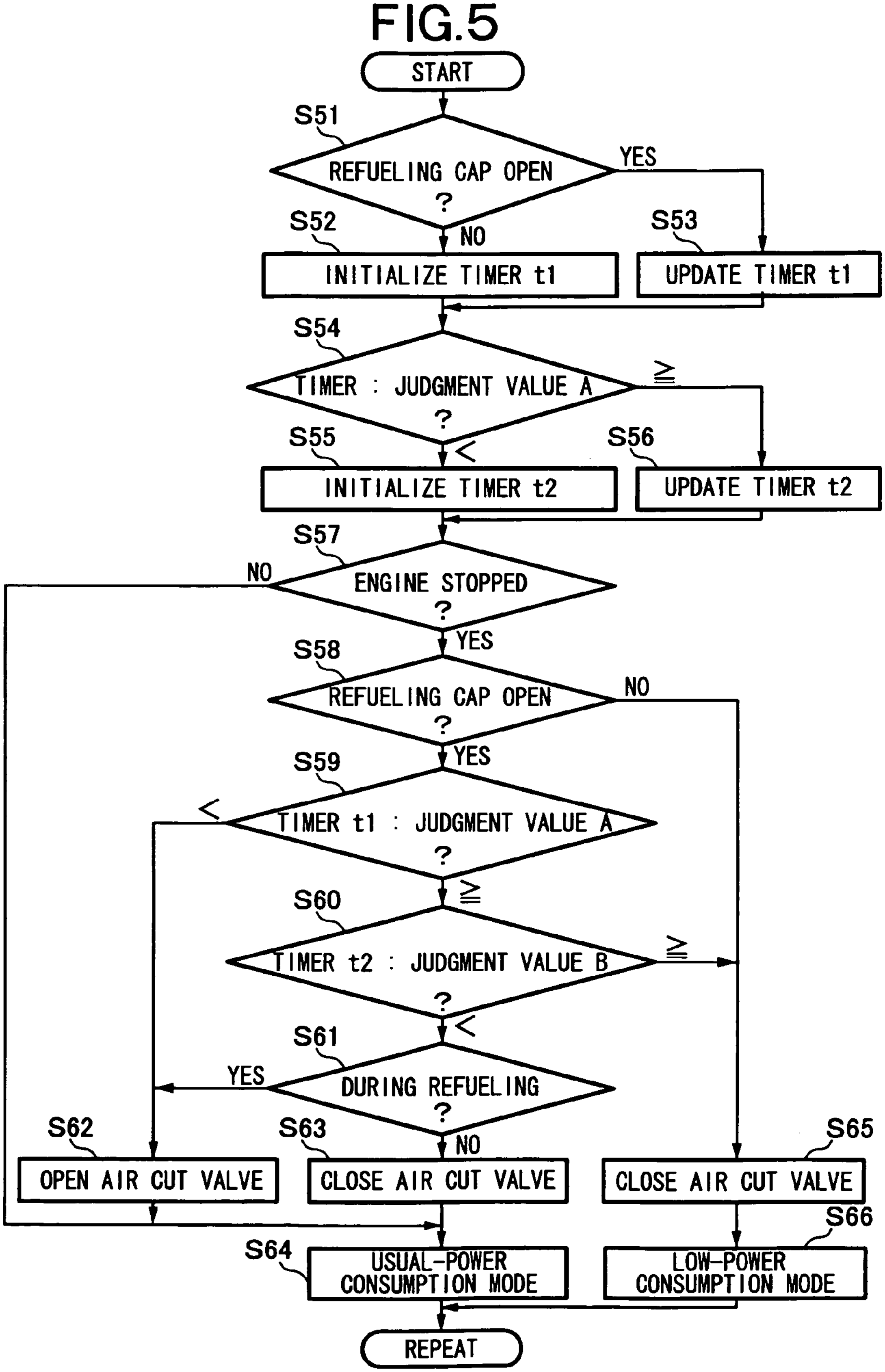
FIG. 5 is a flow chart showing a fourth embodiment of refueling control according to the present invention.

The flow chart of FIG. 5 shows a fourth embodiment of the refueling control.

In step S51, it is determined whether refueling cap 27 of fuel tank 10 is open or not, by the signal from switch 24.

In the case where refueling cap 27 is closed, control proceeds to step S52, and the value of timer t1 is initialized to zero.

On the other hand, in the case where refueling cap 27 is open, control proceeds to step S53, and by updating the value of the timer t1, the time during which refueling cap 27 is open is measured by the timer t1.

In step S54, it is determined whether the timer t1 is greater than or equal to a predetermined judgment value A or not.

In the case where the timer t1 is less than the judgment value A, control proceeds to step S55, and the value of a timer t2 is initialized to zero.

On the other hand, in the case where the timer t1 is greater than or equal to the judgment value A, control proceeds to step S56, and the value of the timer t2 is updated.

Accordingly, the timer t2 indicates the elapsed time after the time during which refueling cap 27 is open reaches the judgment value A.

In step S57, it is determined whether engine 1 is stopped or not.

When engine 1 is operating, fuel supply control module 22 needs to operate in usual-power consumption mode in order to control fuel pump 11 and for purge control. Hence control proceeds to step S64, and usual-power consumption mode is set.

On the other hand, when engine 1 is stopped, control proceeds to step S58, and determines whether refueling cap 27 of fuel tank 10 is open or not, by the signal from switch 24.

In the case where it is determined that refueling cap 27 is closed, control proceeds to step S65.

In step S65, the output of a drive signal to air cut valve 20 is stopped, and in the next step S66, control shifts to low-power consumption mode.

Accordingly, even in the case where the engine is stopped for refueling, control is held in low-power consumption mode until refueling cap 27 is opened, and in the case where refueling is not performed, low-power consumption mode is maintained until the next time that the engine starts.

In the case of refueling fuel tank 10, the actual refueling operation is performed after refueling cap 27 is opened, so the fact that refueling cap 27 is open is a prerequisite for refueling.

In the case of refueling, it is necessary to prevent the pressure in the tank from increasing accompanying the refueling, by forcing air cut valve 20 open. However, in the case where refueling cap 27 is closed, which is not a refueling condition, it is not necessary to force air cut valve 30 open.

Therefore, in the case where it is determined that refueling cap 27 is closed, control stops the output of a drive signal to air cut valve 20. Furthermore, control shifts to low-power consumption mode, reducing the power consumption while the engine is stopped.

On the other hand, in step S58 if it is determined that refueling cap 27 is open, control proceeds to step S59.

In step S59, it is determined whether or not the value of the timer t1 is greater than or equal to the judgment value A.

If the value of the timer t1 is less than the judgment value A, control proceeds to step S62, and the output of a drive signal to air cut valve 20 is set. Then control proceeds to step S64, and usual-power consumption mode is set.

By setting usual-power consumption mode, it is possible to output a drive signal to air cut valve 20. Then, by outputting the drive signal to air cut valve 20, air cut valve 20 is opened, so that it is possible to refuel fuel tank 10 continuously.

Immediately after refueling cap 27 is opened, even if actual refueling is not being performed, it is in a state where there is a high probability of starting refueling imminently, hence air cut valve 20 is maintained in an open state ready for refueling.

Accordingly, even in the case where refueling is performed immediately after refueling cap 27 is opened, it is possible to maintain air cut valve 20 in an open state when refueling is started.

On the other hand, in step S59, in the case where it is determined that the timer t1 is greater than or equal to the judgment value A, control proceeds to step S60.

In step S60, it is determined whether or not the timer t2 is greater than or equal to a judgment value B.

Then in the case where the timer t2 is less than the judgment value B, control proceeds to step S61.

In step S61, it is determined whether refueling is actually being performed or not.

In step S61, it is determined that refueling is actually being performed in the case where the residual fuel amount detected by fuel level gauge 23 is increasing, or in the case where the pressure in fuel tank 10 detected by pressure sensor 21 is increasing.

In detail, it is determined that refueling is actually being performed when, calculating the amount of change per unit time of the residual fuel amount and/or the pressure in the tank, the amount of change is greater than or equal to a threshold value.

In the case where actual refueling is determined, control proceeds to step S62 similarly to when the timer t1 is determined to be less than the judgment value A, and the output of a drive signal to air cut valve 20 is set. Furthermore, control proceeds to step S64, and usual-power consumption mode is set.

Accordingly, in the case where actual refueling starts before the timer t1 exceeds the judgment value A, and the refueling continues even after exceeding the judgment value A, a state in which air cut valve 20 is forced open in usual-power consumption mode continues as it is.

On the other hand, in step S61, if it is determined that refueling is not being performed, even if refueling cap 27 is open, it is not necessary to open air cut valve 20. Hence control proceeds to step S63, the output of a drive signal to air cut valve 20 is stopped, and air cut valve 20 is set to be in a closed state.

However, in the case where control proceeds from step S61 to step S63, a possibility of refueling remains, so control proceeds to step S64, and usual-power consumption mode is maintained.

That is, at the point in time that the time during which refueling cap 27 remains open reaches "A+B", control shifts to low-power consumption mode, whereas if refueling cap 27 is closed before the time during which refueling cap 27 remains open reaches "A+B", control shifts to low-power consumption mode.

Accordingly, it is not necessary for fuel supply control module 22 to continue to be held in usual-power consumption mode to be ready for refueling while the engine is stopped. Hence it is possible to economize on the power consumption while the engine is stopped.

Furthermore, even before the time during which refueling cap 27 remains open reaches "A+B", after it exceeds A, the output of a drive signal to air cut valve 20 is controlled based on whether actual refueling is being performed or not. Hence it is possible to prevent an increase in the power consumption due to unnecessary drive signal output.

Moreover, in step S60, in the case where it is determined that the timer t2 is greater than or equal to B, control proceeds to step S65, and the output of a drive signal to air cut valve 20 is stopped. Then in the next step S66, control shifts to low-power consumption mode.

In the case where it is determined that the timer t2 is greater than or equal to B, it means that a time greater than or equal to "A+B" has elapsed since refueling cap 27 was opened.

The time "A+B" is set to be longer than the time that is normally required from when refueling cap 27 is opened to when refueling is completed.

Accordingly, in the case where the open state of refueling cap 27 is maintained over the time "A+B", it can be predicted that closing refueling cap 27 has been forgotten. Therefore, when a time greater than or equal to "A+B" has elapsed since refueling cap 27 was opened, the output of a drive signal to air cut valve 20 is stopped, and a shift to low-power consumption mode is forced.

In this manner, it is possible to prevent fuel supply control module 22 from being left in usual-power consumption mode due to closing refueling cap 27 being forgotten.

The flow chart of FIG. 5 shows the process while the engine is stopped. While the engine is operating, opening control of air cut valve 20 is performed according to a purge request and the like.

In the case where fuel supply control module 22 does not perform drive control of fuel pump 11, and may perform normal operation only during a limited period such as a purge request time, usual-power consumption mode is set only when a purge request or the like is generated while the engine is operating, and can shift to low-power consumption mode when there is no purge request.

Furthermore, it is possible to alter the judgment values A and B according to the amount of residual fuel in fuel tank 10.

Figure 6:
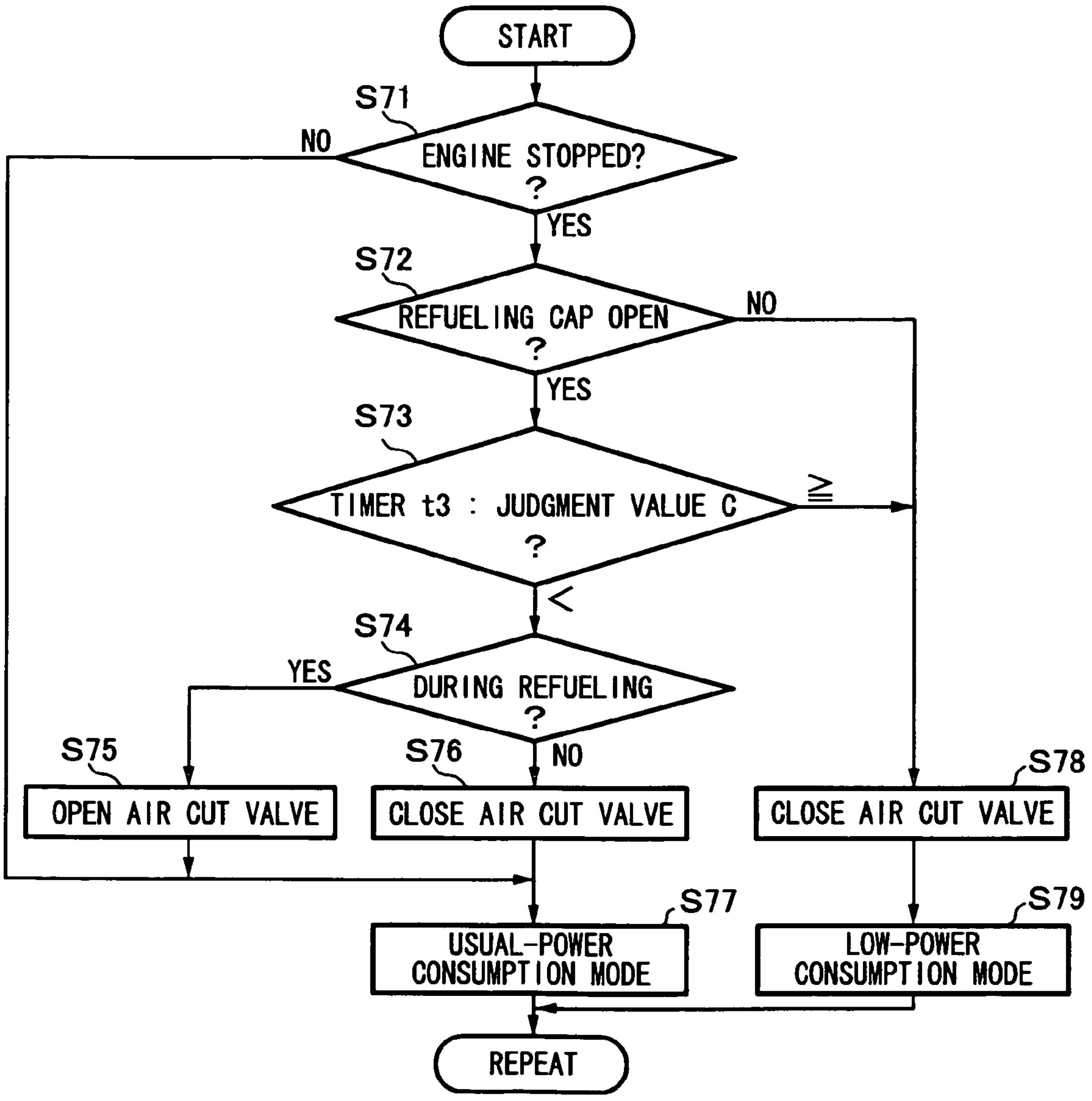
FIG. 6 is a flow chart showing a fifth embodiment of refueling control according to the present invention.

The flow chart of FIG. 6 shows a fifth embodiment of the refueling control.

In step S71, it is determined whether the engine is stopped or not.

Then if the engine is operating, control proceeds to step S77, and usual-power consumption mode is set.

On the other hand, in the case where the engine is stopped, control proceeds to step S72.

In step S72, it is determined whether refueling cap 27 of fuel tank 10 is open or not, by the signal from switch 24.

In the case where refueling cap 27 is open, control proceeds to step S73.

In step S73, it is determined whether or not the value of a timer t3 that indicates the time during which refueling cap 27 is open is greater than or equal to a judgment value C.

Here, judgment value C=judgment value A+judgment value B.

When the value of the timer t3 is less than the judgment value C, control proceeds to step S74.

In step S74, similarly to step S61, it is determined whether refueling is actually being performed or not, in other words, whether or not there is actually a state in which the output of a drive signal to air cut valve 20 has been requested.

In the case where refueling is actually being performed, control proceeds to step S75, and the output of a drive signal to air cut valve 20 is set. Then control proceeds to step S77, and usual-power consumption mode is set.

On the other hand, in the case where a refueling operation is not being performed, control proceeds to step S76, and the output stop of a drive signal to air cut valve 20 is set. Then control proceeds to step S77, and usual-power consumption mode is set.

Moreover, in the case where it is determined that refueling cap 27 is closed in step S72, and in the case where it is determined that the value of the timer t3 is greater than or equal to the judgment value C in step S73, control proceeds to step S78, and the output of a drive signal to air cut valve 20 is stopped. Then control proceeds to step S79, and low-power consumption mode is set.

According to the above-described construction, when refueling cap 27 is opened, control shifts to usual-power consumption mode, and by refueling cap 27 being closed, shifts to low-power consumption mode. Thus the power consumption of fuel supply control module 22 in a state in which refueling is not performed is economized.

However, when the time during which refueling cap 27 is open is greater than or equal to the judgment value C, even if refueling cap 27 is open, by forcing a shift to low-power consumption mode, it prevents from being left in usual-power consumption mode due to closing refueling cap 27 being forgotten.

Furthermore, while usual-power consumption mode is set, only in the case where refueling is actually being performed is a drive signal output to air cut valve 20. Hence power consumption due to unnecessary drive signal output can be prevented.

In the case of the above-described fifth embodiment, the opening of air cut valve 20 is controlled after actual refueling starts to be performed. However, it does not obstruct the refueling operation significantly.

It is possible to detect the open state of fuel filler lid 28 instead of detecting the open state of refueling cap 27. Furthermore, it is possible to determine whether both of refueling cap 27 and fuel filler lid 28 are in an open state or not.

Moreover, it is possible to determine whether a vehicle is stopped for example at a gas station or not, based on the detection of vehicle position information, and data received from outside, and in a state in which it is stopped at a gas station, usual-power consumption mode is maintained, and the output of a drive signal to air cut valve 20 is controlled based on whether refueling is actually being performed or not. Furthermore, it is possible to determine whether the refueling is actually being performed or not, based on whether fuel filler lid 28 and/or refueling cap 27 is open or not.

The entire contents of Japanese Patent Application No. 2005-176405, filed Jun. 16, 2005 and Japanese Patent Application No. 2005-176406, filed Jun. 16, 2005 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

I claim:

1. A control apparatus for a vehicle having an engine and a fuel tank, the control apparatus comprising:
- a solenoid valve which enables refueling of said fuel tank when said solenoid valve receives a drive signal;
- a detector configured to detect a condition of said vehicle; and
- a control unit that:
  - receives an input signal from said detector;
  - is adapted to output said drive signal to said solenoid valve;
  - determines whether or not conditions require refueling of said fuel tank;
  - shifts to a low-power consumption mode, in which output of said drive signal to said solenoid valve is disabled, when it is determined that refueling is not required; and
  - returns to a usual-power consumption mode, in which output of said drive signal to said solenoid valve is enabled, when it is determined that refueling is required.

2. A control apparatus for a vehicle according to claim 1, wherein said control unit determines whether or not conditions require refueling of said fuel tank, based on whether a cap which covers a filler hole of said fuel tank is open or not.

3. A control apparatus for a vehicle according to claim 1, wherein said control unit determines whether or not conditions require refueling of said fuel tank, based on whether said vehicle is stopped at a gas station or not.

4. A control apparatus for a vehicle according to claim 1, wherein said control unit shifts to said low-power consumption mode when conditions requiring refueling of said fuel tank continue for more that a predetermined time.

5. A control apparatus for a having an engine and a fuel tank, the control apparatus comprising:
- a solenoid valve which enables refueling of said fuel tank when said solenoid valve receives a drive signal;
- a detector configured to detect a condition of said vehicle; and
- a control unit that:
  - receives an input signal from said detector;
  - is adapted to output said drive signal to said solenoid valve;
  - determines whether or not conditions require the output of said drive signal to said solenoid valve, and selects, based on the result of said determination, either one of a low-power consumption mode that is unable to output said drive signal, and a usual-power consumption mode that is able to output said drive signal, to thereby allow said control unit per se to operate on the basis of the selected mode;

determines, in said usual-power consumption mode, whether there are actually conditions requiring output of said drive signal or not, based on a fuel level in said fuel tank; and controls the output of said drive signal based on whether or not there are actually conditions requiring the output of said drive signal.

6. A control apparatus for a vehicle having an engine and a fuel tank, the control apparatus comprising:

a solenoid valve which enables refueling of said fuel tank when said solenoid valve receives a drive signal;

a detector configured to detect a condition of said vehicle; and a control unit that:

receives an input signal from said detector;

is adapted to output said drive signal to said solenoid valve;

determines whether or not conditions require the output of said drive signal to said solenoid valve, and selects, based on the result of said determination, either one of a low-power consumption mode that is unable to output said drive signal, and a usual-power consumption mode that is able to output said drive signal, to thereby allow said control unit per se to operate on the basis of the selected mode;

determines, in said usual-power consumption mode, whether there are actually conditions requiring output of said drive signal or not, based on a pressure in said fuel tank; and controls the output of said drive signal based on whether or not there are actually conditions requiring the output of said drive signal.

7. A method of switching a mode of a control unit in a vehicle having an engine and a fuel tank, the control unit controlling an output of a drive signal to a solenoid valve which enables refueling of said fuel tank when said solenoid valve receives said drive signal, the method comprising the steps of:

determining whether or not conditions require refueling of said fuel tank;

shifting to a low-power consumption mode, in which output of said drive signal to said solenoid valve is disabled, when it is determined that refueling is not required; and returning to a usual-power consumption mode, in which output of said drive signal to said solenoid valve is enabled, when it is determined that refueling is required.

8. A method of switching a mode of a control unit according to claim 7, wherein said step for determining whether or not conditions require refueling of said fuel tank, includes the step of determining whether or not a cap which covers a filler hole of said fuel tank is open.

9. A method of switching a mode of a control unit according to claim 7, wherein said step for determining whether or not conditions require refueling of said fuel tank, includes the step of determining whether or not the vehicle is stopped at a gas station.

10. A method of switching a mode of a control unit according to claim 7, further including the step of shifting the control unit to said low-power consumption mode when conditions requiring refueling of said fuel tank continue for more that a predetermined time.

11. A method of switching a mode of a control unit in a vehicle having an engine and a fuel tank, the control unit controlling an output of a drive signal to a solenoid valve which enables refueling of said fuel tank when said solenoid valve receives said drive signal, the method comprising the steps of:

determining whether or not conditions reqiuire the output of said drive signal to said solenoid valve;

selecting, based on result of said determination, either one of a low-power consumption mode that is unable to output said drive signal, and a usual-power consumption mode that is able to output said drive signal;

determining, in said usual-power consumption mode, whether there are actually conditions requiring output of said drive signal or not, based on a change in a fuel level in said fuel tank; and controlling the output of said drive signal based on whether or not there are actually conditions requiring the output of said drive signal.

12. A method of switching a mode of a control unit in a vehicle having an engine and a fuel tank, the control unit controlling an output of a drive signal to a solenoid valve which enables refueling of said fuel tank when said solenoid valve receives said drive signal, the method comprising the steps of:

determining whether or not conditions require the output of said drive signal to said solenoid valve;

selecting, based on result of said determination, either one of a low-power consumption mode that is unable to output said drive signal, and a usual-power consumption mode that is able to output said drive signal;

determining, in said usual-power consumption mode, whether there are actually conditions requiring output of said drive signal or not, based on a change in a pressure in said fuel tank; and controlling the output of said drive signal based on whether or not there are actually conditions requiring the output of said drive signal.

* * * * *